United States Patent
Park et al.

(10) Patent No.: US 9,322,472 B2
(45) Date of Patent: Apr. 26, 2016

(54) METHOD OF CONTROLLING PARKING CONTROL DEVICE OF TRANSMISSION

(71) Applicants: Hyundai Motor Company, Seoul (KR); Kia Motors Corp., Seoul (KR)

(72) Inventors: Han Gil Park, Suwon-si (KR); Ki Young Song, Seoul (KR); Chang Hyun Lee, Seoul (KR); Yang Rae Cho, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 14/465,504

(22) Filed: Aug. 21, 2014

(65) Prior Publication Data

US 2015/0176709 A1    Jun. 25, 2015

(30) Foreign Application Priority Data

Dec. 19, 2013    (KR) .......................... 10-2013-0159596

(51) Int. Cl.

| | |
|---|---|
| F16H 63/48 | (2006.01) |
| F16D 63/00 | (2006.01) |
| B60T 1/06 | (2006.01) |
| B60T 7/08 | (2006.01) |
| F16H 63/34 | (2006.01) |
| F16H 61/02 | (2006.01) |

(52) U.S. Cl.
CPC .............. *F16H 63/483* (2013.01); *B60T 1/062* (2013.01); *B60T 7/085* (2013.01); *F16D 63/006* (2013.01); *F16H 63/3458* (2013.01); *F16H 2061/0255* (2013.01)

(58) Field of Classification Search
CPC ... F16H 63/48; F16H 63/483; F16H 63/3458; F16H 63/3466; F16H 63/3491; F16H 2061/0255; F16D 63/006; F16D 65/0006; B60T 1/062

See application file for complete search history.

(56) References Cited

U.S. PATENT DOCUMENTS

2004/0195071 A1    10/2004  Khaykin et al.
2007/0225117 A1*   9/2007   Shimizu .................... B60T 7/12
                                                            477/182

FOREIGN PATENT DOCUMENTS

| JP | 2004-345558 A | 12/2004 |
|---|---|---|
| JP | 2009-121546 A | 6/2009 |
| JP | 2009-162346 A | 7/2009 |
| KR | 10-2008-0044687 A | 5/2008 |
| KR | 10-2011-0062879 A | 6/2011 |
| KR | 10-2012-0003529 A | 1/2012 |

* cited by examiner

*Primary Examiner* — Jacob S Scott
(74) *Attorney, Agent, or Firm* — Morgan, Lewis & Bockius LLP

(57) ABSTRACT

A method of controlling a parking control device of a transmission may include a) inputting data about a state of a vehicle, b) determining, based on the data input at the step a), whether a current situation is a first situation in which an actuator of the parking control device of the transmission is to be promptly controlled, a second situation in which noise is controlled to be minimized, or a third situation which is a situation other than the first and second situations, and c) controlling a Pulse Width Modulation (PWM) duty cycle required to control the actuator to different values depending on the first, second, and third situations determined at the step b), thus driving the actuator.

6 Claims, 2 Drawing Sheets

METHOD OF CONTROLLING PARKING CONTROL DEVICE OF TRANSMISSION

CROSS-REFERENCE(S) TO RELATED APPLICATION

The present application claims priority of Korean Patent Application Number 10-2013-0159596 filed on Dec. 19, 2013, the entire contents of which application is incorporated herein for all purposes by this reference.

BACKGROUND OF THE INVENTION

1. Field of the Invention

The present invention relates, in general, to a method of controlling a parking control device of a vehicle transmission and, more particularly, to technology for controlling the parking control device of a shift-by-wire transmission using an actuator provided outside of the transmission.

2. Description of Related Art

A shift-by-wire transmission, which is an electronic gearshift system, is configured to shift gears via Controller Area Network (CAN) communication or the like without requiring a mechanical link structure or the like, but is configured to shift gears by controlling gear positions using the transmission itself or an external actuator so as to perform operation matching a gear position desired by a consumer.

In such an electronic transmission system, gear positions are basically controlled using the internal oil pressure of a transmission and an electrical solenoid, but a separate device for controlling the gear position of the transmission to position P or N according to the power state or engine state of a vehicle is required. In the case of external control of the transmission, the transmission is configured to be operated by an actuator equipped with a motor, and the control lever of the transmission is controlled to position P or N.

In this way, when the position P or N of the transmission is controlled by the actuator equipped with the motor, there is a need to optimize the operating speed or noise of the motor according to the state of the vehicle, so that the reliability of the vehicle must be secured in such a way that, when a function required for safety needs to be performed, prompt operability is provided and, when operating noise needs to be minimized, low-noise operability is provided, and a user is allowed to feel patterns related to uniform operating speed and operating noise.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling the parking control device of a transmission, which optimizes the operating speed or operating noise of a motor according to the state of a vehicle when the position P or N of a shift-by-wire transmission is controlled by an actuator equipped with the motor, so that the reliability of the vehicle can be secured in such a way that, when a function required for safety needs to be performed, prompt operability is provided and, when operating noise needs to be minimized, low-noise operability is provided, and a user is allowed to feel patterns related to uniform operating speed and operating noise.

In an aspect of the present invention, a method of controlling a parking control device of a transmission, may include a) inputting data about a state of a vehicle, b) determining, based on the data input at a step of the a), whether a current situation is a first situation in which an actuator of the parking control device of the transmission is to be promptly controlled, a second situation in which noise is controlled to be minimized, or a third situation which is a normal situation, and c) controlling a Pulse Width Modulation (PWM) duty cycle required to control the actuator to different values depending on the first, second, and situations determined at a step of the b), thus driving the actuator.

The data input at the step of the a) may include an starting state of an engine, a state of the transmission, a speed of the vehicle, a temperature of Automatic Transmission Fluid (ATF), and a voltage of a battery.

The step of the b) is configured to, when it is determined, based on the data including the vehicle speed and the starting state of the engine, that the current situation is a situation in which an ignition is turned off while the vehicle is being driven, determine a current mode to be an operating speed priority mode in which the actuator is to be promptly controlled.

The step of the b) is configured to, when it is determined, based on the data including the vehicle speed and the state of the transmission, that the current situation is a situation in which a malfunction occurs in the transmission while the vehicle is being driven, determine a current mode to be an operating speed priority mode in which the actuator is to be promptly controlled.

The step of the b) is configured to, when it is determined, based on the data including the vehicle speed, that the current situation is a situation in which parking at position N is conducted by a user, determine a current mode to be an operating noise priority mode in which the actuator is to be controlled to minimize noise.

A step of the c) is configured such that when it is determined at the step of the b) that the current situation is the first situation in which the actuator is to be promptly controlled, a duty cycle required to control the actuator is controlled to 100% that is a maximum value, when it is determined at the step of the b) that the current situation is the second situation in which the actuator is to be controlled to minimize noise, the duty cycle is controlled to A % less than 50%, and when it is determined at the step of the b) that the current situation is the third situation, the duty cycle is controlled to a value ranging from B % to C %, wherein the A, the B, and the C may have a relation of 0%<the A %<the B %<the C %<100%.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
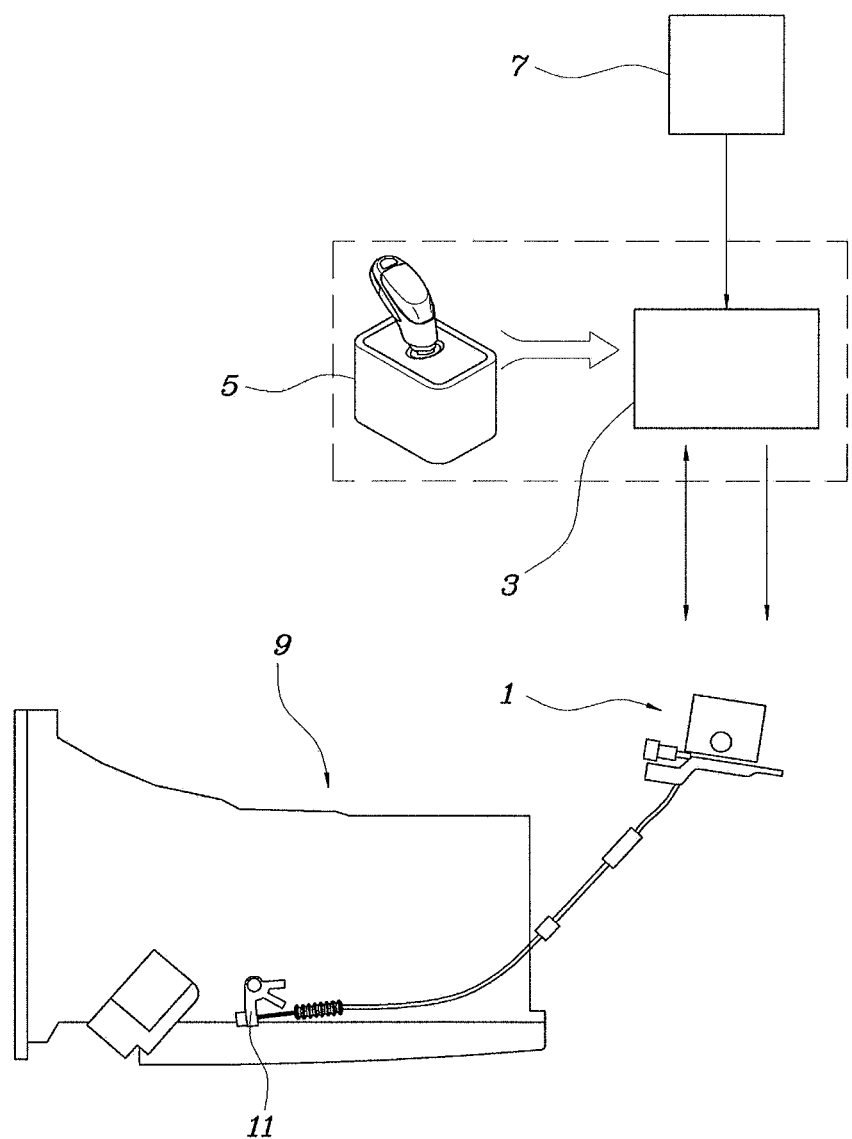
FIG. 1 is a diagram showing the configuration of a shift-by-wire transmission to which the present invention is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the attached drawings.

FIG. 1 is a diagram showing a configuration in which a parking control device of a shift-by-wire transmission to which a control method according to an exemplary embodiment of the present invention may be applied is operated by an external actuator 1 equipped with a motor. This is configured such that, when a lever controller 3 controls the motor of the actuator 1 based on a manipulation signal for a gearshift lever 5 and information received from an external controller 7, that is, a Transmission Control Unit (TCU), an Engine Management System (EMS), or the like, the control lever 11 of a transmission 9 is operated, and then a shift between position P and position N is performed.

Figure 2:
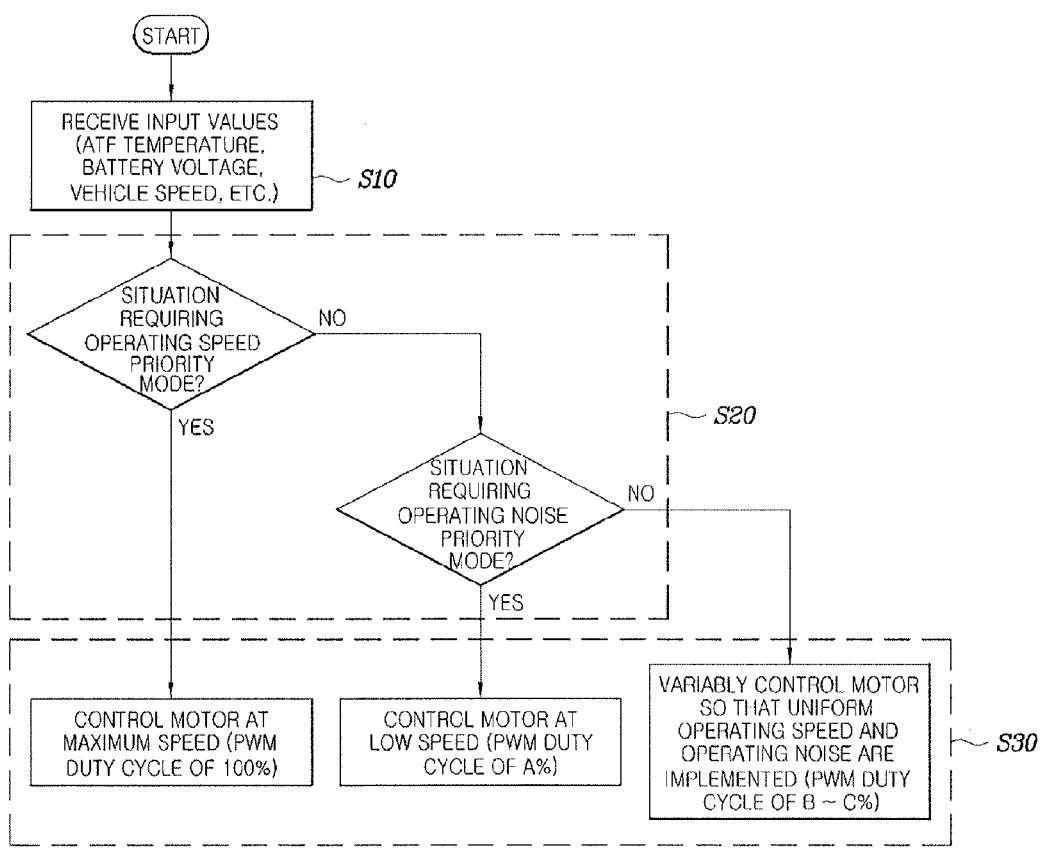
FIG. 2 is a flowchart showing an exemplary embodiment of a method of controlling the parking control device of a transmission according to an exemplary embodiment of the present invention.

Referring to FIG. 2, an exemplary embodiment of a method of controlling the parking control device of a transmission according to an exemplary embodiment of the present invention includes an input step S10, a situation determination step S20, and a driving step S30. At the input step S10, data about the state of a vehicle is input. At the situation determination step S20, it is determined, based on the data input at the input step S10, whether a current situation corresponds to a situation in which the actuator 1 of the transmission parking control device is to be promptly controlled, a situation in which noise is to be controlled to a minimum, or a normal situation. At the driving step S30, a Pulse Width Modulation (PWM) duty cycle required to control the motor of the actuator 1 is controlled to different values depending on the situation determined at the situation determination step S20, and thus the actuator 1 is driven.

The above-described processing is substantially performed by the lever controller 3, and is configured to not only perform the manipulation of the gearshift lever 5 by a driver, but also input required data from the TCU or the EMS via CAN communication or the like at the input step S10, determine the current situation of the vehicle, and control the PWM duty cycle required to drive the actuator 1 to different values depending on the determined situation.

The data input at the input step S10 includes the starting state of an engine, the state of the transmission, the speed of the vehicle, the temperature of Automatic Transmission Fluid (ATF), and the voltage of a battery, and, in addition, various types of data may be input.

At the situation determination step S20, when it is determined, based on data including the vehicle speed and the engine starting state, that the current situation is a situation in which the ignition of the vehicle is turned off while the vehicle is being driven, a current mode is determined to be an operating speed priority mode in which the actuator 1 must be promptly controlled.

Further, at the situation determination step S20, when it is determined, based on data including the vehicle speed and the transmission state, that the current situation is a situation in which a malfunction occurs in the transmission while the vehicle is being driven, the current mode is determined to be an operating speed priority mode in which the actuator 1 must be promptly controlled.

That is, in an emergency in which the ignition is turned off while the vehicle is being driven, and then the occurrence of ratcheting inside the transmission must be prevented, or when a malfunction occurs in the transmission, and then there is a need to promptly shift the gear to position N, the mode is determined to be the operating speed priority mode so as to obtain high operating speed when possible, and the motor of the actuator 1 is controlled at a PWM duty cycle of 100%, as will be described later, thus securing the safety of the vehicle.

Of course, in addition, in the situation related to the safety of the vehicle, the mode is determined to be the operating speed priority mode, as described above, and thus actions may be promptly taken.

Meanwhile, at the situation determination step S20, when it is determined, based on data including the vehicle speed, that the current situation is parking at position N by the user, the current mode is determined to be an operating noise priority mode in which the actuator 1 must be controlled to minimize noise.

That is, as in the case of parking at position N, in the situation in which the user can sensitively feel the operating sound of the actuator 1, the PWM duty cycle is set to a level at which noise is minimized when possible, and smooth operability may be secured, thus enabling the motor of the actuator 1 to be driven.

The driving step S30 is configured such that, as described above, when it is determined at the situation determination step S20 that the current situation is the situation in which the actuator 1 is to be promptly controlled, the duty cycle required to control the motor of the actuator 1 is controlled to a maximum value, that is, 100%. Further, when it is determined at the situation determination step S20 that the current situation is the situation in which the actuator 1 is to be controlled to minimize noise, the duty cycle is controlled to A % less than 50%. Furthermore, when it is determined at the situation determination step S20 that the current situation is a normal situation, the duty cycle is controlled to a value of B % to C %. Here, A, B, and C have a relation of $0<A<B<C<100\%$.

For example, A may be set to 30%, B may be 50%, and C may be set to 70%.

At the situation determination step S20, when the current situation is determined to be a normal situation that is neither the operating speed priority mode nor the operating noise priority mode, the situation of the vehicle is reflected so that the user can feel uniform operating speed and operating noise, and thus the PWM duty cycle of the motor is variably controlled so that it ranges from B to C.

For example, upon starting the engine in a cold environment, it may be difficult to operate the control lever of the transmission due to the viscosity of oil compared to normal cases. Therefore, in this situation, the temperature or the like of ATF is considered and the battery voltage or the like at that time is further considered, so that the PWM duty cycle is set to a value higher than that in normal times, thus enabling the operating speed and the operating noise in normal times to be implemented.

If control is performed as described above, the duration of a situation in which an excessive operation is forced upon the motor is minimized, so that the durability of the motor may be improved, and the current consumption of the motor may also be reduced to contribute to the improvement of fuel efficiency, and so that a user can feel the reliability of a vehicle owing to operating speed and operating noise at uniform levels, thus enabling the marketability of the vehicle to be consequently enhanced.

As described above, the present invention optimizes the operating speed or operating noise of a motor according to the state of a vehicle when the position P or N of a shift-by-wire transmission is controlled by an actuator equipped with the motor, so that the reliability of the vehicle can be secured in such a way that, when a function required for safety needs to be performed, prompt operability is provided and, when operating noise needs to be minimized, low-noise operability is provided, and a user is allowed to feel patterns related to uniform operating speed and operating noise.

Further, the durability of a motor can be improved by suitably driving the motor depending on a situation, and electricity consumed in driving the motor can be reduced.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a parking control device of a transmission, comprising:
    a) inputting data about a state of a vehicle;
    b) determining, based on the data input at the step a), whether a current situation is a first situation in which an actuator of the parking control device of the transmission is to be promptly controlled, a second situation in which noise is controlled to be minimized, or a third situation which is a situation other than the first and second situations; and
    c) controlling a Pulse Width Modulation (PWM) duty cycle required to control the actuator to different values depending on the first, second, and third situations determined at the step b), thus driving the actuator.

2. The method of claim 1, wherein the data input at the step a) includes a starting state of an engine, a state of the transmission, a speed of the vehicle, a temperature of Automatic Transmission Fluid (ATF), and a voltage of a battery.

3. The method of claim 2, wherein the step b) is configured to, when it is determined, based on the data including the vehicle speed and the starting state of the engine, that the current situation is the first situation in which an ignition is turned off while the vehicle is being driven, determine a current mode to be an operating speed priority mode in which the actuator is to be promptly controlled.

4. The method of claim 2, wherein the step b) is configured to, when it is determined, based on the data including the vehicle speed and the state of the transmission, that the current situation is the first situation in which a malfunction occurs in the transmission while the vehicle is being driven, determine a current mode to be an operating speed priority mode in which the actuator is to be promptly controlled.

5. The method of claim 2, wherein the step b) is configured to, when it is determined, based on the data including the vehicle speed, that the current situation is the second situation in which parking at position N is conducted by a user, determine a current mode to be an operating noise priority mode in which the actuator is to be controlled to minimize noise.

6. The method of claim 1, wherein the step c) is configured such that:
    when it is determined at the step b) that the current situation is the first situation in which the actuator is to be promptly controlled, a duty cycle required to control the actuator is controlled to 100% that is a maximum value,
    when it is determined at the step b) that the current situation is the second situation in which the actuator is to be controlled to minimize noise, the duty cycle is controlled to A % less than 50%, and
    when it is determined at the step b) that the current situation is the third situation, the duty cycle is controlled to a value ranging from B % to C %,
    wherein the A, the B, and the C have a relation of 0%<the A %<the B %<the C %<100%.

* * * * *